(12) United States Patent
Beed (10) Patent No.: US 7,571,523 B2
(45) Date of Patent: Aug. 11, 2009

(54) RETRACTABLE HOOK SYSTEM AND METHOD

(76) Inventor: Rick Beed, 2132 Westlake Ave., North Suite #123, Seattle, WA (US) 98109

( * ) Notice: Subject to any disclaimer, the term of this patent is extended or adjusted under 35 U.S.C. 154(b) by 317 days.

(21) Appl. No.: 11/233,504

(22) Filed: Sep. 22, 2005

(65) Prior Publication Data

US 2008/0083100 A1 Apr. 10, 2008

(51) Int. Cl.
*A44B 13/02* (2006.01)
*F16B 45/02* (2006.01)

(52) U.S. Cl. ...................... 24/600.2; 24/3.11

(58) Field of Classification Search ........... 24/600.2, 24/3.11, 599.1, 599.9; 294/82.17, 82.21, 294/82.23; 292/307 A
See application file for complete search history.

(56) References Cited

U.S. PATENT DOCUMENTS

| | | | | |
|---|---|---|---|---|
| 1,386,561 A | * | 8/1921 | Foster | 294/82.23 |
| 1,684,322 A | * | 9/1928 | Itjen | 24/598.5 |
| 3,952,382 A | * | 4/1976 | Vaage | 24/598.5 |
| 4,152,814 A | * | 5/1979 | Ito | 294/82.21 |
| 4,358,880 A | * | 11/1982 | Garcia | 24/600.2 |
| 4,401,333 A | * | 8/1983 | Merry | 294/82.34 |
| 5,319,349 A | * | 6/1994 | Smith, III | 340/7.63 |
| 5,606,782 A | * | 3/1997 | Patterson et al. | 24/598.5 |
| 5,634,246 A | * | 6/1997 | Jermyn, Jr. | 24/601.5 |
| 5,867,877 A | * | 2/1999 | Patterson et al. | 24/598.5 |
| 6,654,900 B1 | * | 11/2003 | Cave | 713/501 |

* cited by examiner

*Primary Examiner*—Robert J Sandy
(74) *Attorney, Agent, or Firm*—Davis Wright Tremaine LLP; Heather M. Colburn (57) ABSTRACT

A retractable hook is used to couple a portable article to another thing. The retractable hook has an attachment section that at least partially extends from and at least partially retracts into a housing section. The attachment section has a gate with open and closed positions. The housing section typically is affixed to a portable article. To couple the portable article to another thing, the attachment section is at least partially extended from the housing section and the gate is opened. The attachment section is then engaged with the other thing and the gate is closed. The attachment section is then at least partially retracted into the housing section.

10 Claims, 11 Drawing Sheets

RETRACTABLE HOOK SYSTEM AND METHOD

BACKGROUND OF THE INVENTION

Small portable articles can exist as a wide range of devices and other items such as cell phones, personal data assistants, other electronic devices, personal or business items, etc. The portable articles tend to be misplaced or pose transport or storage issues. A solution is to couple the portable articles to something more easily located or offering a way to transport or store. Unfortunately, on one hand, some devices for coupling portable articles are relatively easy to become uncoupled after being previously coupled and on the other hand, other devices that afford relatively secure coupling tend to be bulky and awkward to use.

DETAILED DESCRIPTION OF THE INVENTION

As disclosed herein a retractable hook system is affixed to a portable device to couple the portable device to an article, such as an article of clothing, another type of article of manufacture, or another type of article.

Figure 1:
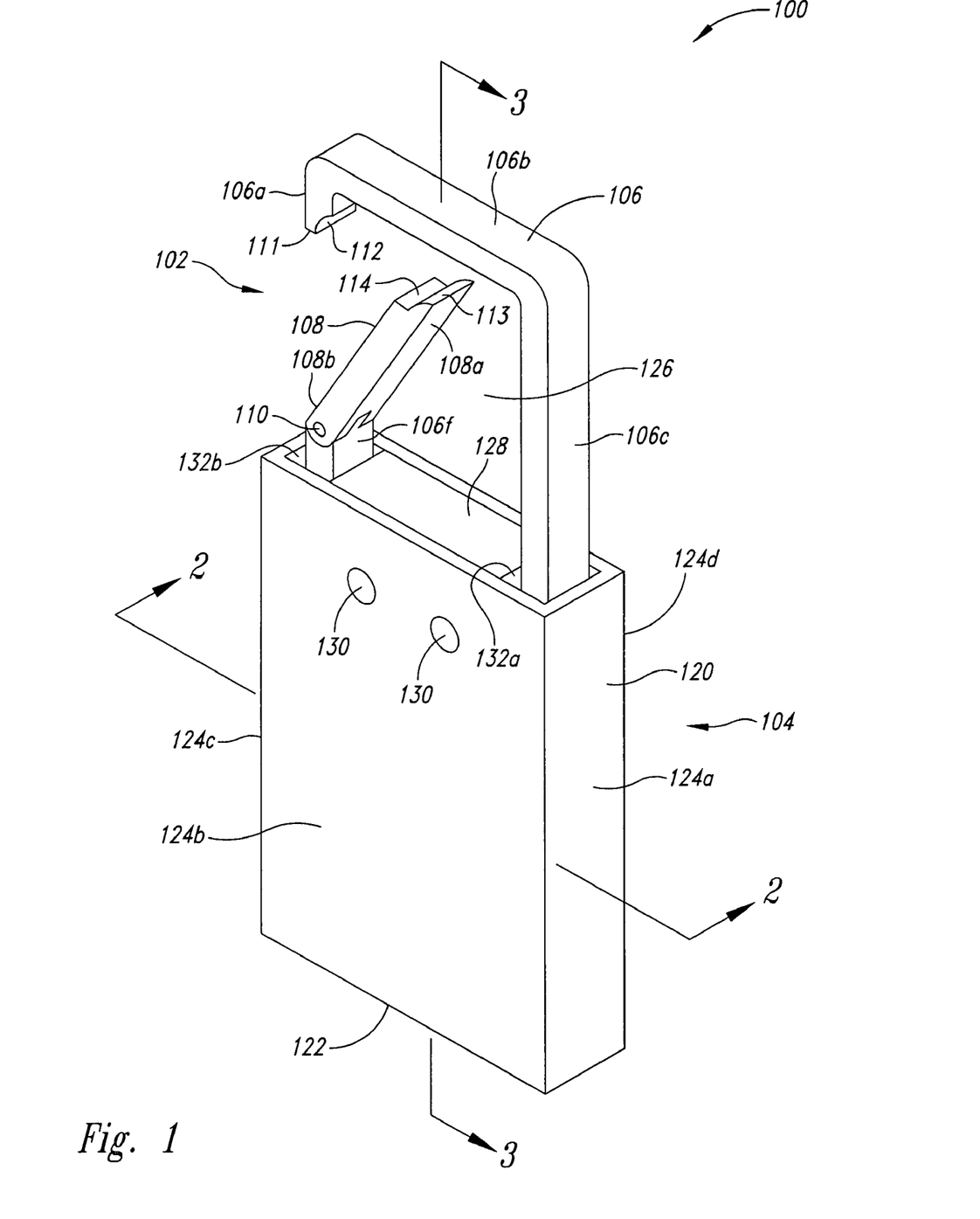
FIG. 1 is an isometric view of a retractable hook system shown is a fully extended, open position.

An implementation of a retractable hook system 100 is depicted in FIG. 1 as having an attachment section 102 in a fully extended position from a housing section 104. The attachment section 102 includes a structure 106 having a first end portion 106a, a first traverse portion 106b, a first longitudinal portion 106c, a second transverse portion 106d, a second longitudinal portion 106e, and a second end portion 106f as further depicted in FIG. 2.

The attachment section also includes a spring-loaded gate 108 (spring not shown) having a first end portion 108a and a second end portion 108b. The second end portion 108b of the gate 108 is rotatably coupled to the second end portion 106f of the structure 106 by a hinge pin 110. The gate 108 is shown in FIGS. 1 and 2 as being in an open position.

Figure 3:
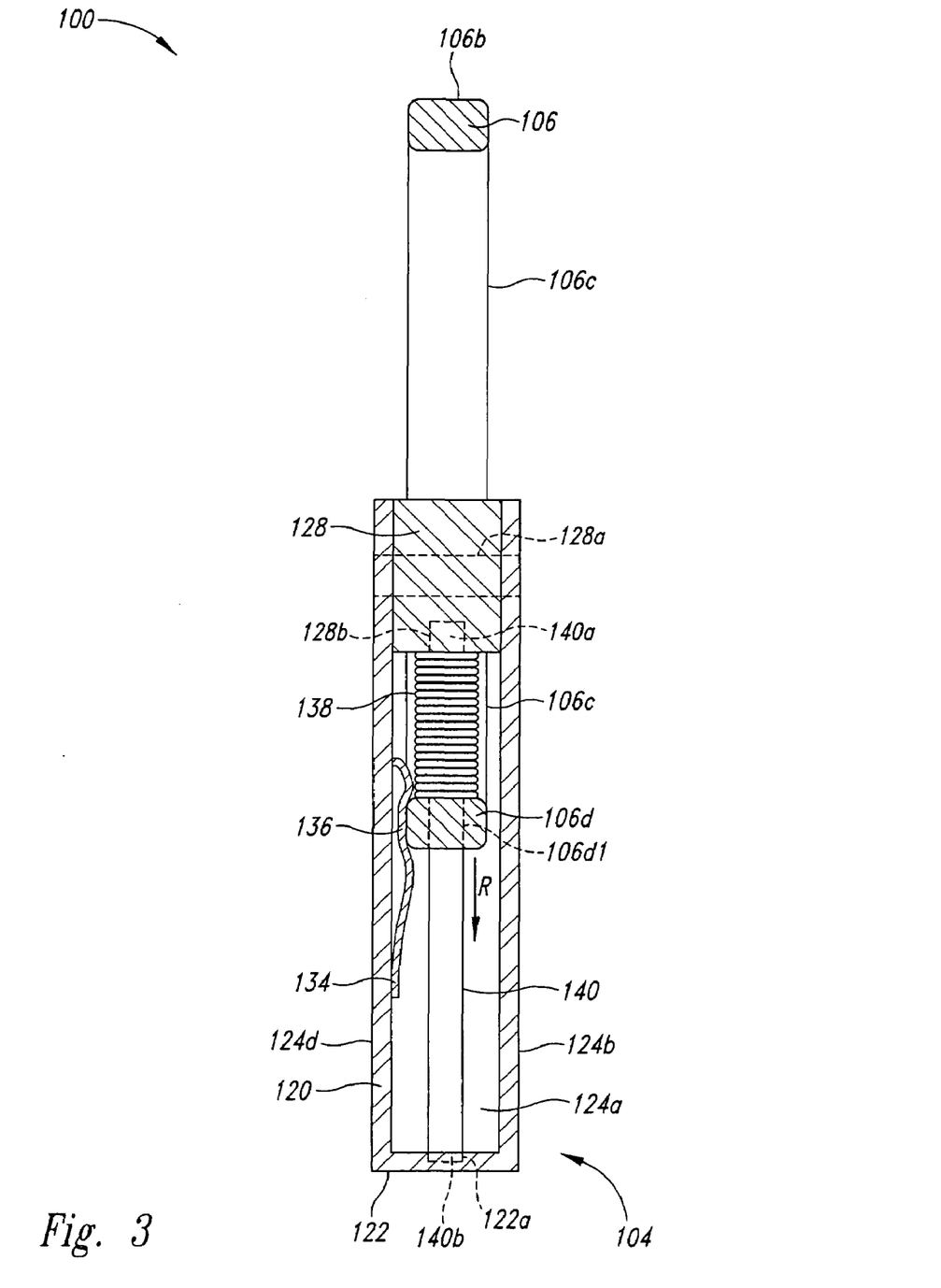
FIG. 3 is an isometric view of the retractable hook system in a closed, fully extended position.

The first end portion 106a of the structure 106 has a structure notch 112 and the first end portion 108a of the gate 108 has a gate tip 113 and a gate notch 114. The structure tip 111 and the gate notch 114 mate together and the structure notch 112 and the gate notch 114 mate together when the gate is in a closed position as shown in FIG. 3.

Figure 2:
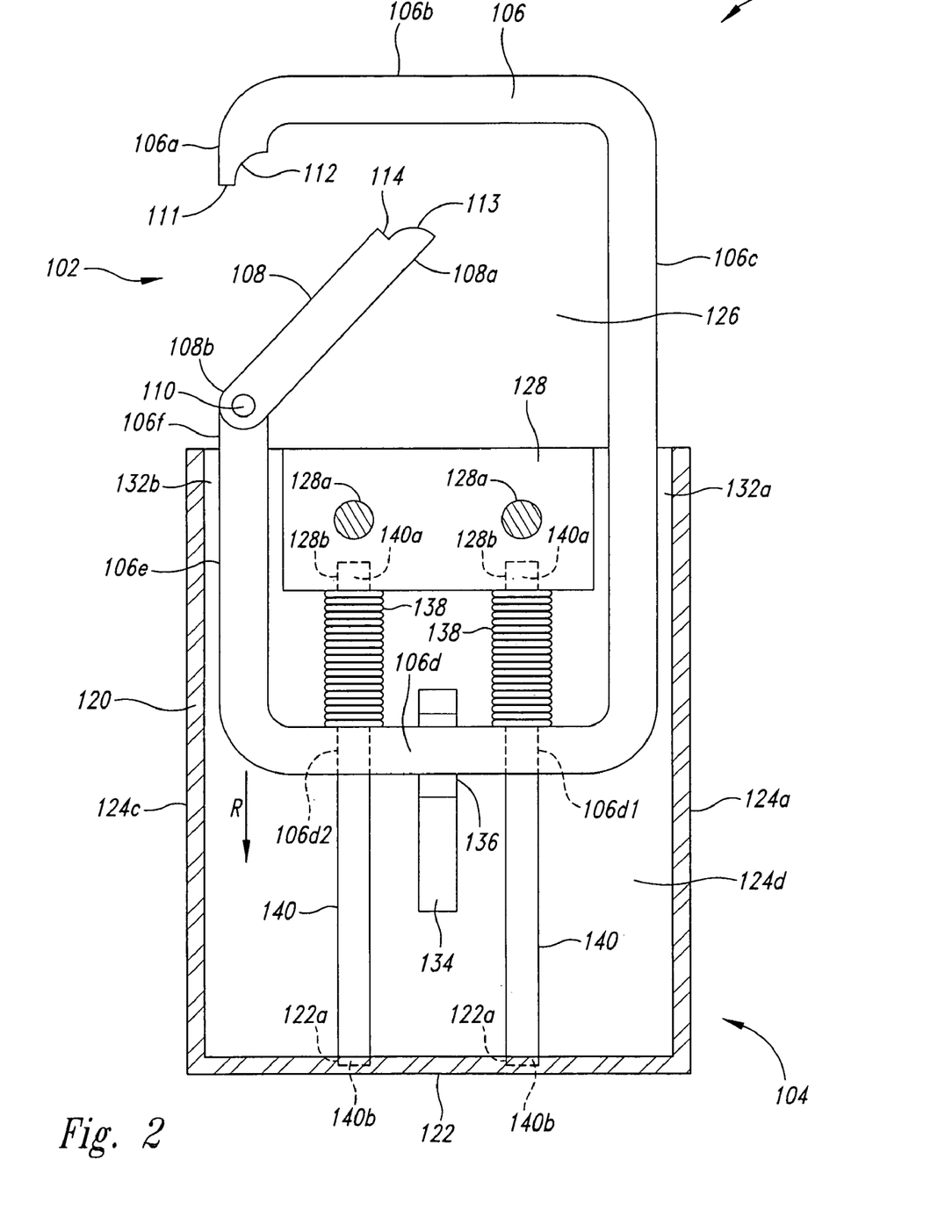
FIG. 2 is a cross-sectional elevational side view of the retractable hook system toward the inner surface of a fourth side of a container, of the retractable hook system shown in the open, fully extended, position of FIG. 1.

The housing section 104 includes a container 120 with a base 122 and extending from the base a first side 124a, a second side 124b, and third side 124c, and a fourth side 124d as shown in FIGS. 1 and 2. The container 120 furthermore has an opening 126 oppositely positioned from the base 122. A beam 128 is located inside of the container 120 and extends from the second side 124b to the fourth side 124d of the container. The beam 128 is coupled to the second side 124b and the fourth side 124d of the container 120 by two fasteners 130 each passing through a different one of two first holes 128a in the beam to affixedly engage the second side, the fourth side and the beam to each other as shown in FIG. 2.

The beam 128 is sized to partially extend between the first side 124a and the third side 124c of the container to provide a first longitudinal passage 132a and a second longitudinal passage 132b. The first longitudinal passage 132a and the second longitudinal passage 132b contain and allow for longitudinal movement of the structure 106 and the gate 108. In the depicted implementation, the first longitudinal portion 106c and the second longitudinal portion 106e of the structure 106 extend from and retract into the first longitudinal passage 132a and the second longitudinal passage 132b, respectively.

Figure 4:
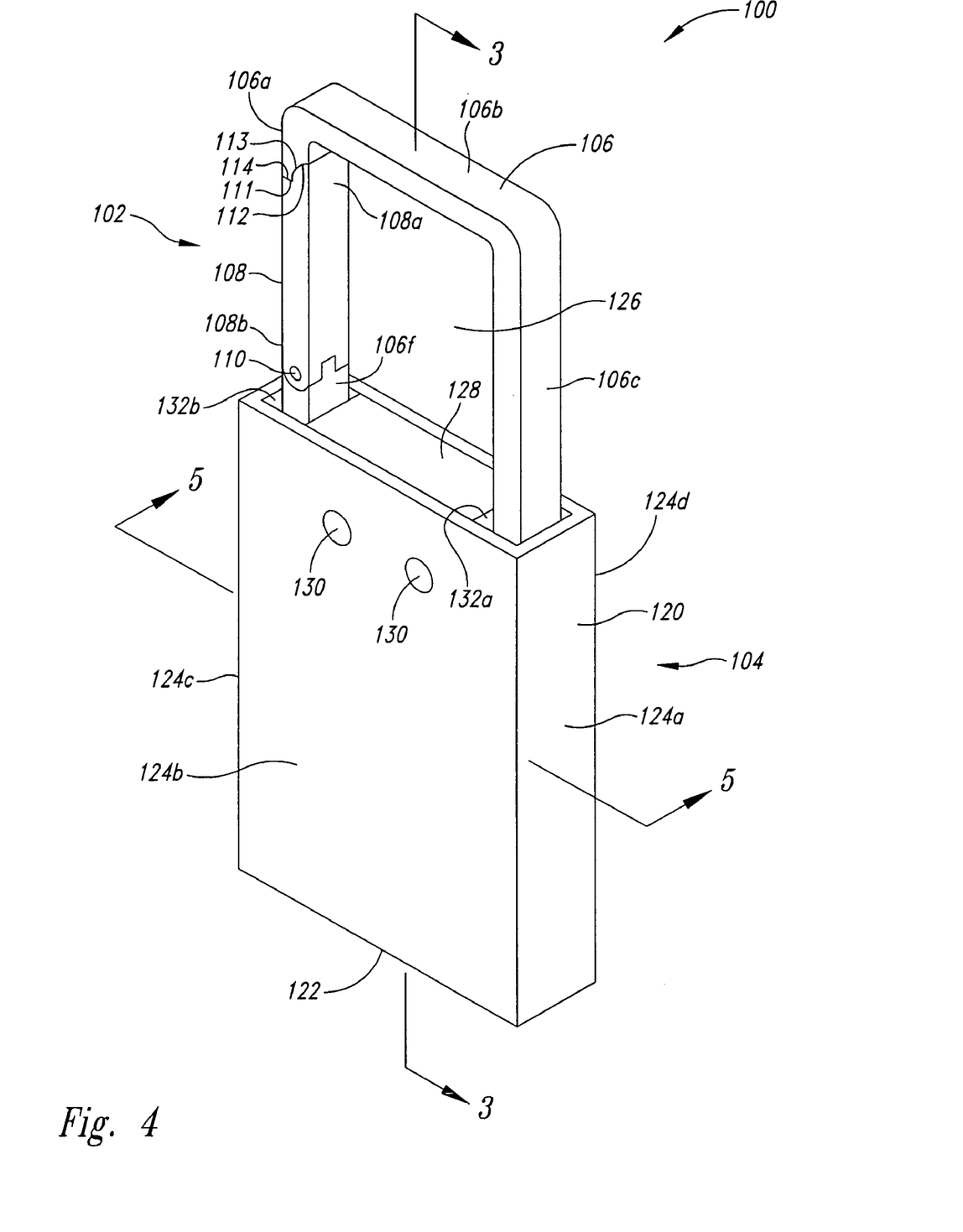
FIG. 4 is a cross-sectional elevational side view of the retractable hook system toward the inner surface of a first side of the container, of the retractable hook system shown in the closed, fully extended position of FIG. 3.
Figure 5:
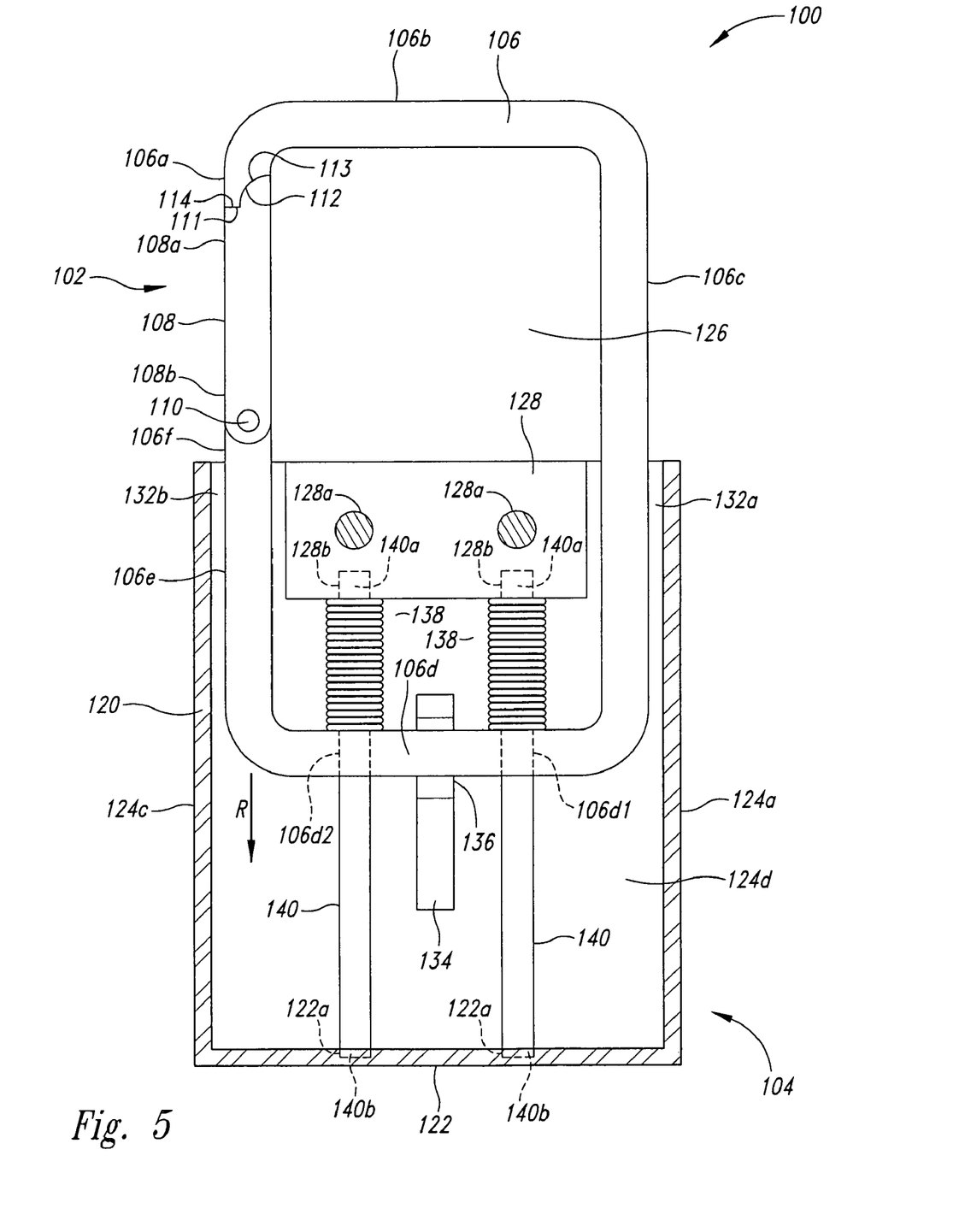
FIG. 5 is a cross-sectional elevational side view of the retractable hook system toward the inner surface of the fourth side of the container, the retractable hook system shown in the closed, fully extended position of FIG. 3.
Figure 6:
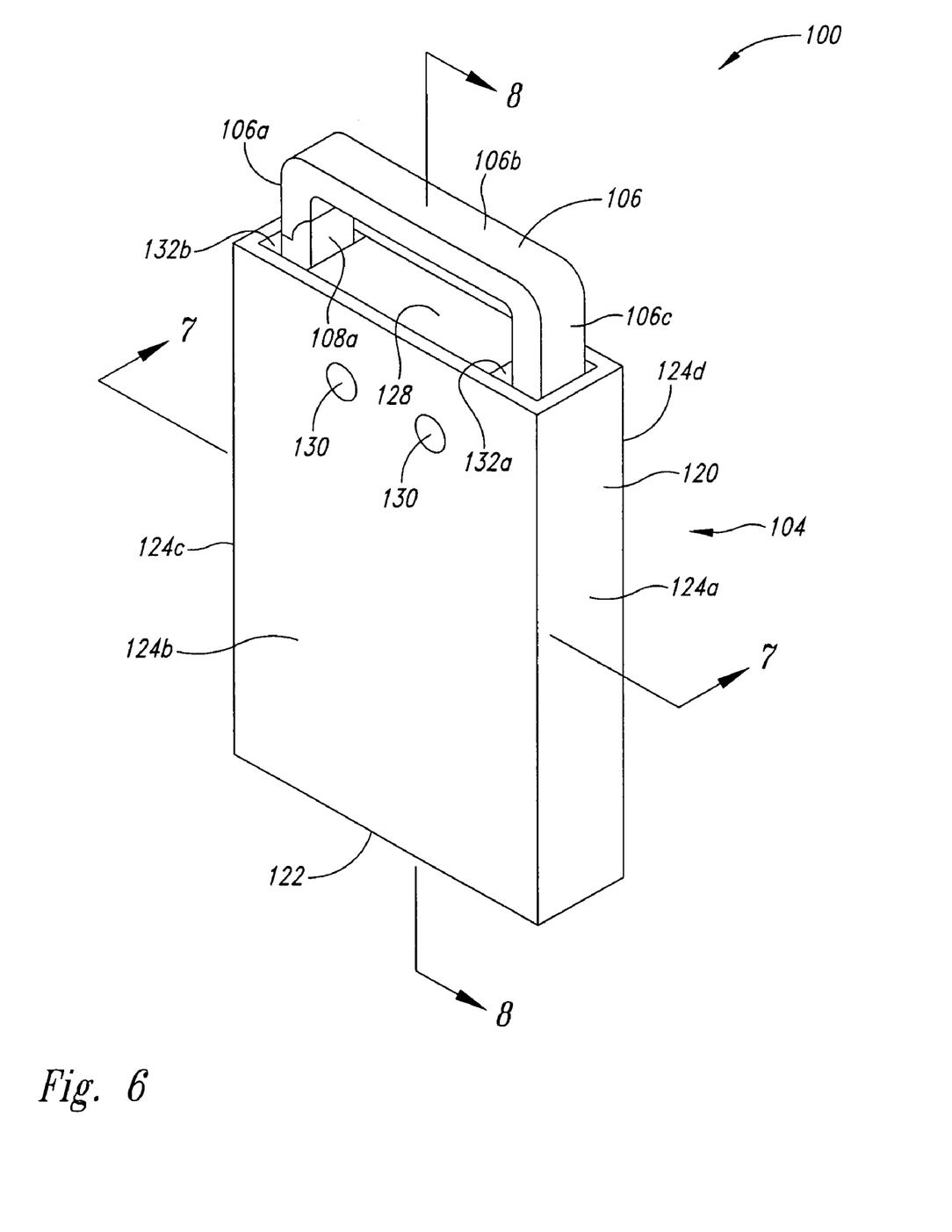
FIG. 6 is an isometric view of a retractable hook system shown in a partially retracted position.
Figure 7:
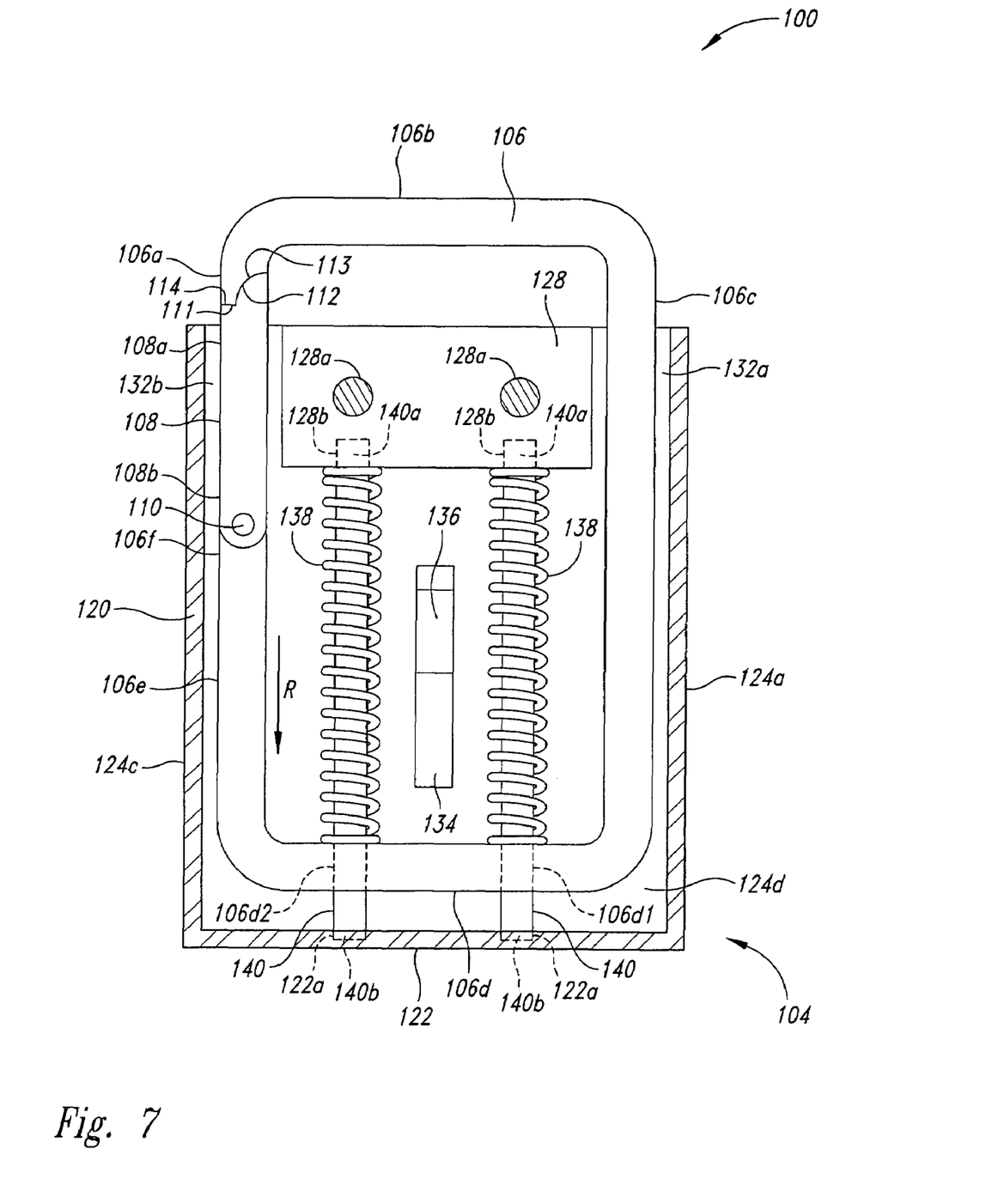
FIG. 7 is a cross-sectional elevational side view of the retractable hook system toward the inner surface of the fourth side of the container, the retractable hook system shown in the partially retracted position of FIG. 6.
Figure 8:
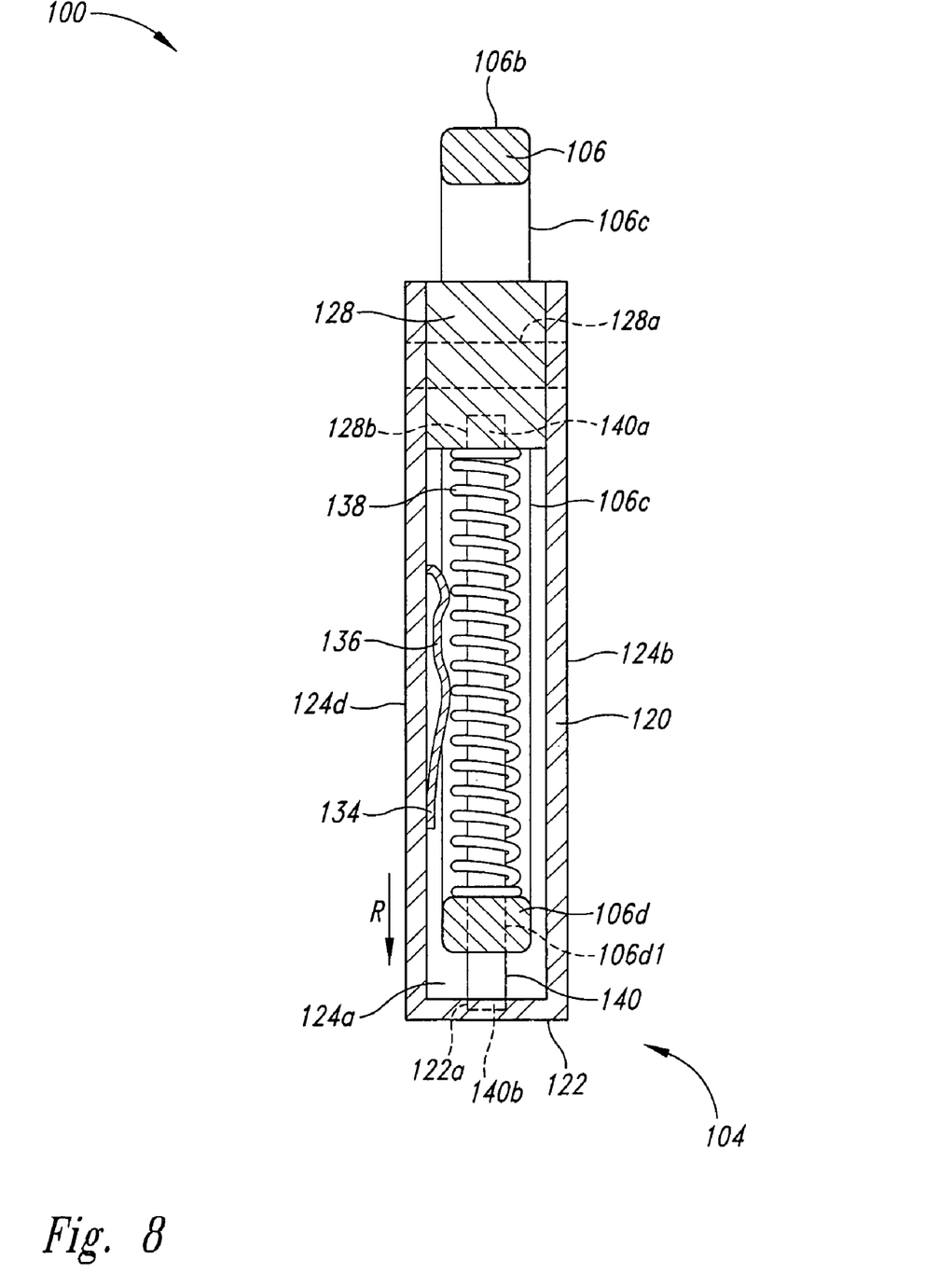
FIG. 8 is a cross-sectional elevational side view of the retractable hook system toward the inner surface of the first side of the container, the retractable hook system shown in the partially retracted position of FIG. 6.
Figure 9:
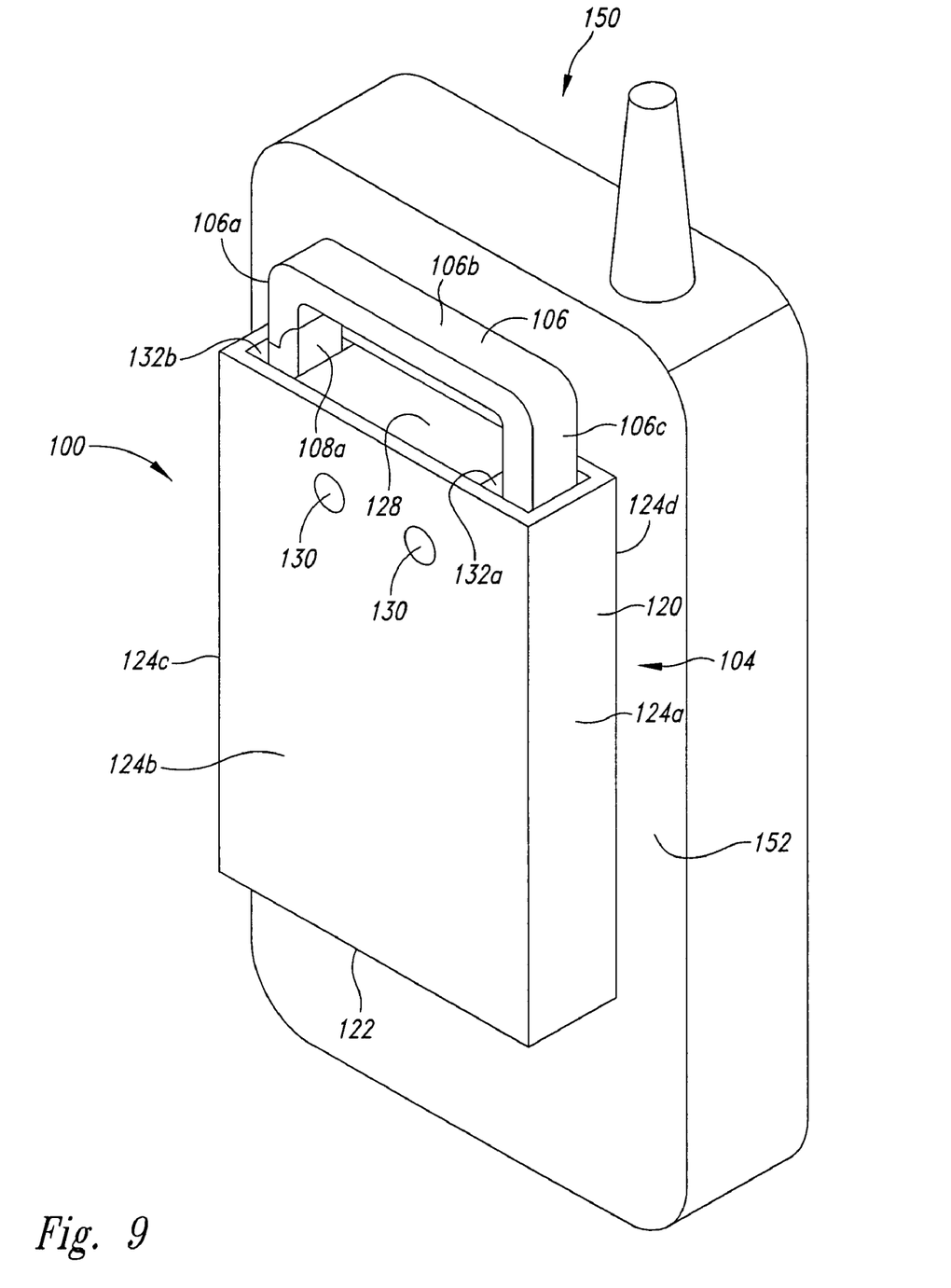
FIG. 9 is an isometric view of the retractable hook system shown affixed to a portable device for coupling the portable device to an article.
Figure 10:
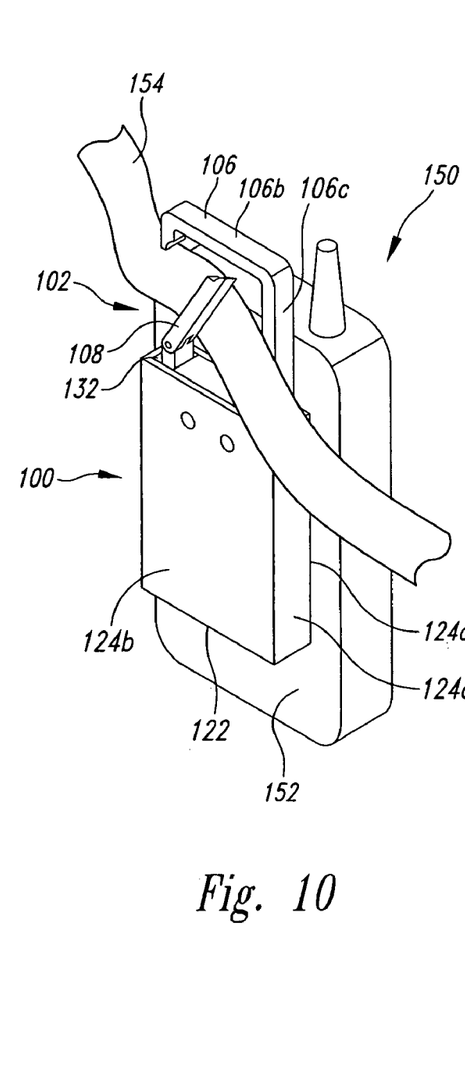
FIG. 10 is an isometric view of the retractable hook system shown in the open, fully extended position in an initial stage of coupling to an elongated member.
Figure 11:
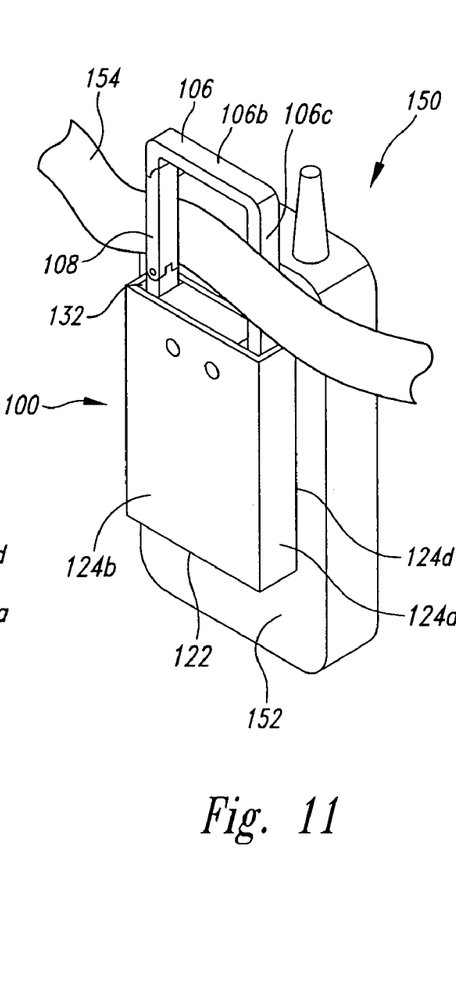
FIG. 11 is an isometric view of the retractable hook system shown in the closed, fully extended position in an interim stage of coupling to the elongated member.
Figure 12:
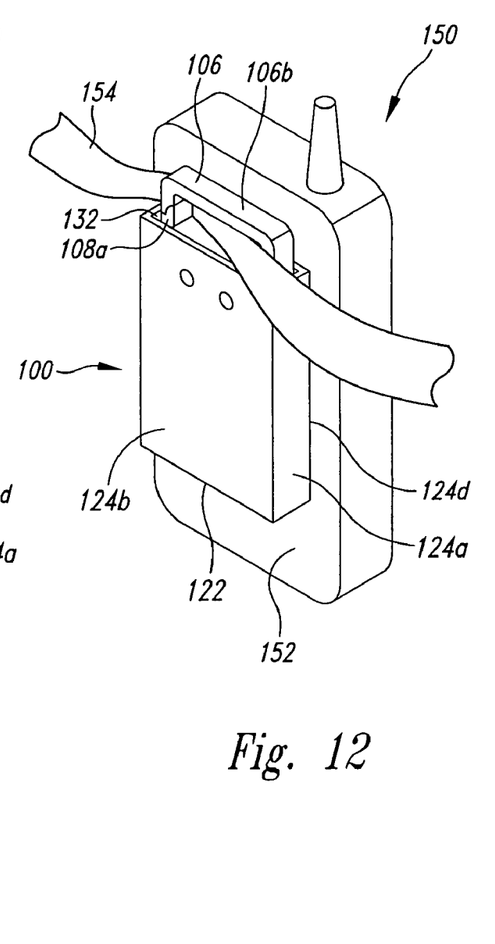
FIG. 12 is an isometric view of the retractable hook system shown in the partially retracted position in a final stage of coupling to the elongated member.
Figure 13:
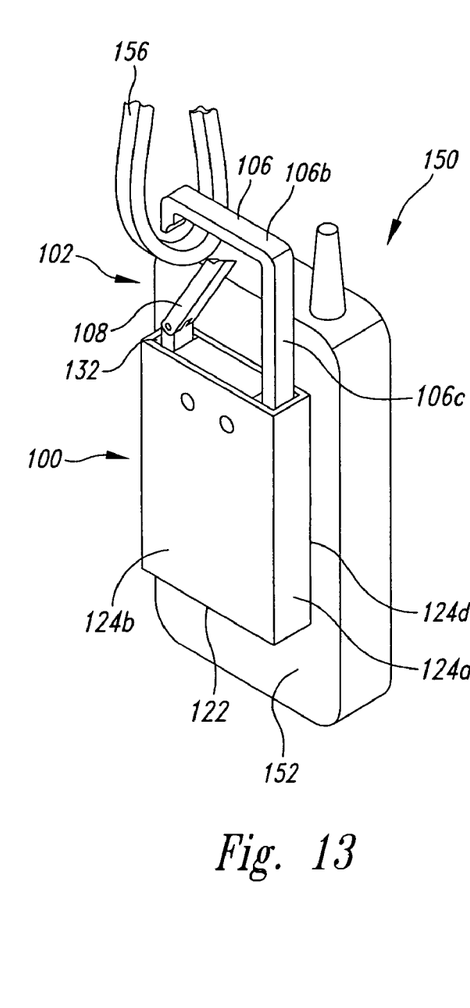
FIG. 13 is an isometric view of the retractable hook system shown in the open, fully extended position in an initial stage of coupling to a loop.
Figure 14:
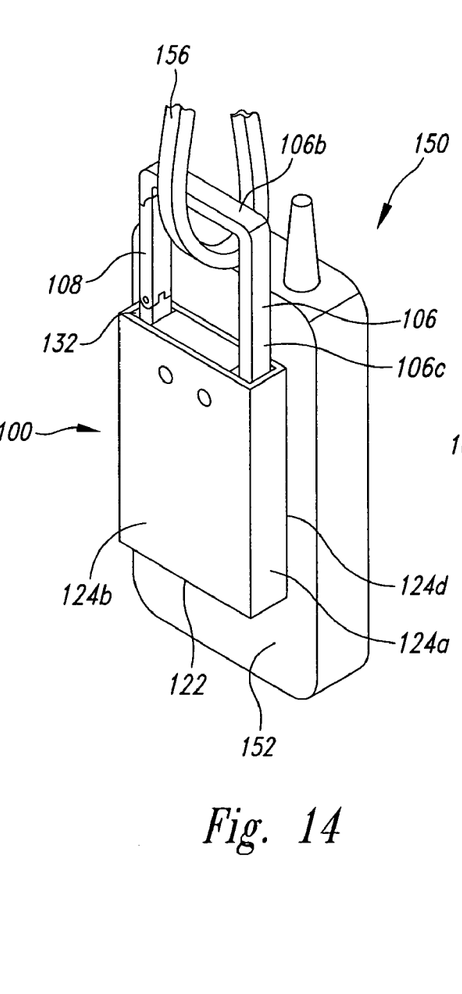
FIG. 14 is an isometric view of the retractable hook system shown in the closed, fully extended position in an interim stage of coupling to the loop.
Figure 15:
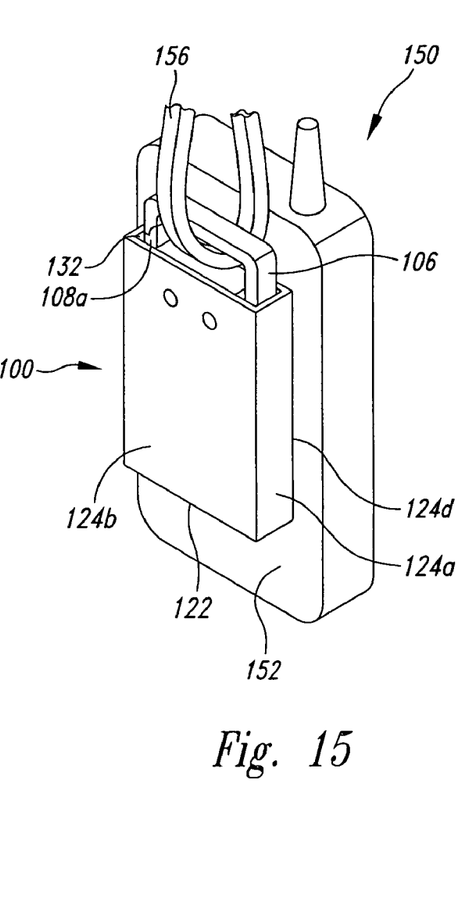
FIG. 15 is an isometric view of the retractable hook system shown in the partially retracted position in a final stage of coupling to the loop.

A retainer 134 with a notch 136 is fixedly attached to the second side 124b of the container 120 being positioned inside the container as shown in FIGS. 2 and 4. When the structure 106 is in the fully extended position, the second transverse portion 106d of the structure tensionally engages with the notch 136 to be retained by the retainer 134, also shown in FIGS. 2 and 4.

In the depicted implementation, engagement of the structure 106 with the retainer 134 is necessary to retain the structure in the fully extended position because of a retracting force applied in the direction R of FIG. 2 by two compressed retraction helical springs 138. Inherent with their helical nature, each of the retraction springs 138 spiral around an axis forming a longitudinal axial void (not shown) through which a different one of two rods 140 extends to guide and position each of the springs.

Each of the two rods 140 have a first end 140a and a second end 140b being inserted into a different one of two holes 128b of the beam 128 and a different one of two holes 122a of the base 122, respectively, to affixedly couple the two rods to the rest of the housing section 104. The second transverse portion 106d of the structure 106 has two holes 106d1 to receive a different one of the two rods so that movement of the structure 106 can be guided by the rods and be in alignment with the retraction springs 138.

To move the structure 106 from the fully extended position to the partially retracted position, a disengagement force is typically applied in the R direction to the first traverse portion 106b or to other portions of the structure. The disengagement force is sufficient to overcome tensional engagement of the retainer 134 with the second transverse portion 106d less spring force already being applied to the second transverse portion of the structure by the retraction springs 138 in the R direction. When the structure 106 is in the partially retracted position, the structure remains in this position due to spring force from the retraction springs on the second transverse portion 106d of the structure in the R direction.

To move the structure 106 from the partially retracted position to the fully extended position, extension force in the direction opposite of the R direction is applied on the first transverse portion 106b or on other portions of the structure. In the travel of the second transverse portion 106d from the partially retracted position up to a position near tensional engagement with the retainer 134, the extension force is of sufficient degree to overcome opposing spring force from the retraction springs 138. To tensionally engage with the retainer 134, the extension force is sufficient to move the second transverse portion 106d into engagement with the retainer.

From the foregoing it will be appreciated that, although specific embodiments of the invention have been described herein for purposes of illustration, various modifications may be made without deviating from the spirit and scope of the invention. For instance, alternative implementations have various other configurations of the structure 106 and the gate 108. For instance, the first transverse portion 106b of the structure 106 and/or the gate 108 could be curved and/or multi-sided. The retraction springs 138 could be located on the rods 140 between the second transverse portion 106d and the base 122 to push on the transverse portion in the direction opposite of the R direction with the retainer 134 being modified to hold the structure in the partially retracted position.

Other implementations could be constructed without the retraction springs 138 by for instance using another modified form of the retainer 134 having two instances of the notch 136 wherein one instance is located as shown in FIG. 4 to hold the structure 106 in the fully extended position and another instance located in a position to hold the structure in a partially retracted position. In other implementations, the container 120 could have a shape other than a four sided box such as a six sided box or another shaped container such as having one or more curved sides. Although many other implementations could exist besides the depicted implementation, the attachment section 102 and the housing section 104 remain configured to allow for retraction of the attachment section 102 into and extension out of the housing section.

As explained, forces to partially retract the structure 106 are in the direction of R and to fully extend the structure are in the opposite direction of R. When the gate 108 is in the closed position, the gate is positioned in line with the direction R so that the extending and retracting forces are received at the first end portion 108a and the second end portion 108b along the longitude of the gate.

As a result, when the extending or retracting forces are applied to the structure 106, the first end portion 106a of the structure 106 and the first end portion 108a of the gate 108 are pressed together and the second end portion 106f of the structure and the second end portion 108b of the gate are pressed together. The first end portion 106a and the first end portion 108a are pressed together such that the structure tip 111 and the gate notch 114 are pressed together and the structure notch 112 of the structure and the gate tip 113 are pressed together. Consequently, the extending and retracting forces are not in a direction to cause the gate 108 to open or to cause either the structure tip 111 or the gate tip 113 to break off.

Since the gate 108 is in line with the second longitudinal portion 106e the extending and retracting forces cause the hinge pin 110 and the second end portion 108b of the gate 108 to press together along the longitudinal direction of the gate. The extending and retracting forces also cause the hinge pin 110 and the second end portion 106f of the structure 106 to press together along the longitudinal direction of the second longitudinal portion 106e.

Consequently, a major portion of the gate 108 can absorb the force received by the gate from the hinge pin 110. Also a major portion of the second longitudinal portion 106e can absorb the force received by the longitudinal portion from the hinge pin 110. Both the gate 108 and the second longitudinal portion 106e will then be less likely to be broken due to the hinge pin 110 pressing against either the gate or the second longitudinal portion from the extending and retracting forces than if the gate was located in a position not in line with the second longitudinal portion.

For added protection, the container 120 could be sized and the beam 128, the retainer 134, and the retraction springs 138 could be sized and positioned to allow the gate 108 to fully retract into the first passage 132a when the structure 106 is in the partially retracted position. With the gate 108 being fully retracted into the first passage 132a, the walls of the first passage would help to support the gate and keep forces from damaging either the gate or the first longitudinal portion 106c or the second longitudinal portion 106e and other longitudinal portions of the structure such as the first end portion 106a.

As another example, the gate 108 could be rotatably coupled to a portion of the first transverse portion 106b of the structure 106 for other reasons such as to comply with a desired fashion requirement.

Accordingly, the invention is not limited except as by the appended claims.

The invention claimed is:

1. For coupling a first item to a second item having a second item portion, a system comprising:
a container couplable to the first item, the container having a first longitudinal passage and a second longitudinal passage;
a structure having a first portion and a second portion, the structure being coupled to the container to slidably extend at least partially along a first direction from the container from a first position and to a second position and retract along opposite the first direction at least partially into the container from the second position to the first position, wherein the first portion slideably extends from the first longitudinal passage in the container and the second portion slideably extends from the second longitudinal passage in the container; and
a gate member being rotatably coupled to the first portion of the structure, the gate member being selectively rotatable between a closed position and an open position when the structure is extended from the container in the second position, the gate member being in the closed position when the structure is in the first position, in the open position, the gate member and the structure are spaced apart to allow passage of the portion of the second item between the gate member and the structure, in the closed position, the gate member and the structure combining to form a perimeter to surround a portion of the second item that has passed between the gate and the structure to couple the second item to the system and thereby to couple the second item to the first item, wherein the structure further comprises a transverse member extending along a second direction transverse to the first direction, the transverse member remaining outside the container when the structure is in the first position, the transverse member forming a portion of the perimeter surrounding the portion of the second item that passed between the gate and the structure, and the transverse member retaining the second item in the perimeter along the first direction when the structure is in the second position.

2. The system of claim 1 wherein the first portion and the second portion are structurally linked together by a third portion substantially transverse to the first direction.

3. The system of claim 2 further comprising a guide member positioned to longitudinally extend along the first direction wherein the third portion is slidably coupled to the guide member.

4. The system of claim 2 further comprising a spring positioned to exert a spring force onto the third portion when the structure is in the second position.

5. The system of claim 2 further comprising a retainer positioned to engage with the third portion when the structure is in the second position.

6. For coupling a first item to a second item having a second item portion, a system comprising:

a container couplable to the first item;

a structure having a first portion and a second portion structurally linked together by a third portion, the structure being coupled to the container to slidably extend at least partially along a first direction from the container from a first position and to a second position and retract along opposite the first direction at least partially into the container from the second position to the first position, the third portion being substantially transverse to the first direction; and a gate member being rotatably coupled to the first portion of the structure, the gate member being selectively rotatable between a closed position and an open position when the structure is extended from the container in the second position, the gate member being in the closed position when the structure is in the first position, in the open position, the gate member and the structure are spaced apart to allow passage of the portion of the second item between the gate member and the structure, in the closed position, the gate member and the structure combining to form a perimeter to surround a portion of the second item that has passed between the gate and the structure to couple the second item to the system and thereby to couple the second item to the first item, wherein the structure further comprises a transverse member extending along a second direction transverse to the first direction, the transverse member remaining outside the container when the structure is in the first position, the transverse member forming a portion of the perimeter surrounding the portion of the second item that passed between the gate and the structure, and the transverse member retaining the second item in the perimeter along the first direction when the structure is in the second position.

7. The system of claim 6 wherein the first portion and the second portion slideably extend from a first longitudinal passage in the container and a second longitudinal passage in the container, respectively.

8. The system of claim 6 further comprising a guide member positioned to longitudinally extend along the first direction wherein the third portion is slidably coupled to the guide member.

9. The system of claim 6 further comprising a spring positioned to exert a spring force onto the third portion when the structure is in the second position.

10. The system of claim 6 further comprising a retainer positioned to engage with the third portion when the structure is in the second position.

* * * * *

UNITED STATES PATENT AND TRADEMARK OFFICE
CERTIFICATE OF CORRECTION

PATENT NO. : 7,571,523 B2  Page 1 of 1
APPLICATION NO. : 11/233504
DATED : August 11, 2009
INVENTOR(S) : Rick Beed It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 640 days.

Signed and Sealed this

Seventh Day of September, 2010

David J. Kappos
*Director of the United States Patent and Trademark Office*